US006490705B1

(12) United States Patent
Boyce

(10) Patent No.: US 6,490,705 B1
(45) Date of Patent: **\*Dec. 3, 2002**

(54) METHOD AND APPARATUS FOR RECEIVING MPEG VIDEO OVER THE INTERNET

(75) Inventor: Jill MacDonald Boyce, Manalapan, NJ (US)

(73) Assignee: Lucent Technologies Inc., Murray Hill, NJ (US)

( \* ) Notice: Subject to any disclaimer, the term of this patent is extended or adjusted under 35 U.S.C. 154(b) by 0 days.

This patent is subject to a terminal disclaimer.

(21) Appl. No.: 09/176,982

(22) Filed: Oct. 22, 1998

(51) Int. Cl.[7] .............................................. H03M 13/35
(52) U.S. Cl. ...................................................... 714/776
(58) Field of Search ................................... 714/776, 779

(56) References Cited

U.S. PATENT DOCUMENTS

| | | | |
|---|---|---|---|
| 5,001,561 A | 3/1991 | Haskell et al. ............... | 358/133 |
| 5,617,541 A | * 4/1997 | Albanese et al. ...... | 395/200.13 |
| 5,771,081 A | 6/1998 | Lee .............................. | 348/845 |
| 5,825,430 A | 10/1998 | Adolph et al. ............... | 348/487 |
| 6,289,485 B1 | * 9/2001 | Shiomoto .................... | 714/779 |
| 6,317,462 B1 | * 11/2001 | Boyce ................... | 375/240.27 |

FOREIGN PATENT DOCUMENTS

EP 0676875 A1 3/1995 ............. H04L/1/00

OTHER PUBLICATIONS

Karlsson et al., "Packet Video and Its Integration into the Network Architecture", IEEE Journal on Selected Areas in Communications, vol. 7, No. 5, Jun. 1989, pp. 739–751.*
Anand et al., "FEC and Priority for VBR Video Distribution over ATM", 1993 Canadian Conf. on Electrical and Computer Engineering, pp. 550–553.*
J.M. Boyce, Packet loss resilient transmission of MPEG video over the Internet, *Signal Processing: Image Communications* 15 (1990) 7–24.

(List continued on next page.)

*Primary Examiner*—Stephen M. Baker
(74) *Attorney, Agent, or Firm*—Stephen M. Gurey

(57) ABSTRACT

In order to transmit an inter-frame coded video signal, such as an MPEG-coded video signal, over a packet-based network such as the Internet, the video signal associated with at least one video frame, is split (102, 402) into a high priority partition and a low priority partition. A systematic forward error erasure/correction (FEC) code (108), such as a Reed Solomon (n,k) code, is then applied to bytes in the high priority partition. The forward error/erasure corrected high priority partition bytes and the low priority partition bytes are then combined (110) into n packets for transmission over the packet network to a receiver/decoder. Each of the n transmitted packets contains a combination of both high priority partition data bytes and low priority partition information bytes. In k of those packets the high priority partition data bytes are all high priority partition information bytes and in n-k of those packets all the high priority partition data byte are parity bytes produced by the FEC coding. More specifically, for each high priority partition byte position within the n packets, the forward error/erasure correction code is applied using one high priority partition information byte from the same byte position in each of those k packets to determine n-k parity bytes, which are arranged, one byte per packet, in the n-k packets containing high priority partition parity bytes. If up to n-k packets are lost in transmission over the packet network to the receiver (500, 600), then the high priority partition bytes in such lost packets can be recovered to applying FEC decoding (506) to the high partition bytes in the received packets. The most visually significant information is thus protected against packet loss over the network.

52 Claims, 3 Drawing Sheets

OTHER PUBLICATIONS

I.E.G. Richardson et al., "MPEG Coding For Error–Resilient Transmission," *Fifth International Conference on Image Processing And Its Applications*, Jul. 4–6,1995, 559–563.

G. Carle et al., "RTMC: An Error Control Protocol for IP–Based Audio–Visual Multicast Applications," *Proceedings 7th International Conference on Computer Communications and Networks*, Oct. 12–15, 1998, 566–573.

C. Perkins et al., "Options for Repair of Streaming Media," Internet Engineering Task Force IETF, Jun. 1998.

M. Andronico et al., "Performance Analysis of Priority Encoding Transmission of MPEG Video Streams," *IEEE Globecom 1996*, Nov. 18–22,1996, vol. 1, 267–271.

C. Perkins, O. Hodson, "Options for Repair of Streaming Media," *Internet Enginering Task Force Internet RFC 2354*, Jun. 1998.

G. Carle and E. Biersack, "Survey of Error Recovery Techniques for IP–Based Audio–Visual Multicast Applications," *IEEE Network*, Nov./Dec., 1997, pp. 24–36.

R. Aravind, M. Civanlar, A. Reibman, "Packet Loss Resilience of MPEG–2 Scalable Video Coding Algorithms," *IEEE Transactions on Circuits and Systems for Video Coding Algorithms*, vol. 6, No. 5, Oct. 1996.

D. Budge, R. McKenzie, W. Mills, W. Diss, and P. Long, "Media–independent Error Correction using RTP," *Internet Engineering Task Force Internet Draft*, May 1997.

M. Podolsky, C. Romer, and S. McCanne, "Simulation of FEC–Based Error Control for Packet Audio on the Internet", *INFOCOM*, Mar. 1998, San Francisco, CA.

V. Hardman M. A. Sasse M. Handley, and A. Watson, "Reliable Audio for Use over the Internet", *Proc. INET '95*, Honolulu, HI, pp. 171–178, Jun. 1995.

J. Boyce and R. Gaglianello, "Packet Loss Effects on MPEG Video Sent Over the Public Internet", *Proceedings ACM Multimedia 98 Conf.*, Bristol England, Sep. 12–16, 1998.

A. Albanese, J. Blomer, J. Edmonds, M. Luby, and M. Sudan, "Priority Encoding Transmission", *IEEE Transactions on Information Theory*, vol. 42, No. 6, Nov. 1996, pp. 1737–1744.

D. Hoffman, G. Fernando, V. Goyal, M. Civanlar, "RTP Payload Format for MPEG1/MPEG2 Video," *Internet Engineering Task Force RFC 2250*, Jan. 1998.

The MPEG–2 standard (ITU–T Recommendation H.262, "Generic Coding of Moving Pictures and Associated Audio Information", Jul. 1995.

* cited by examiner

FIG. 1
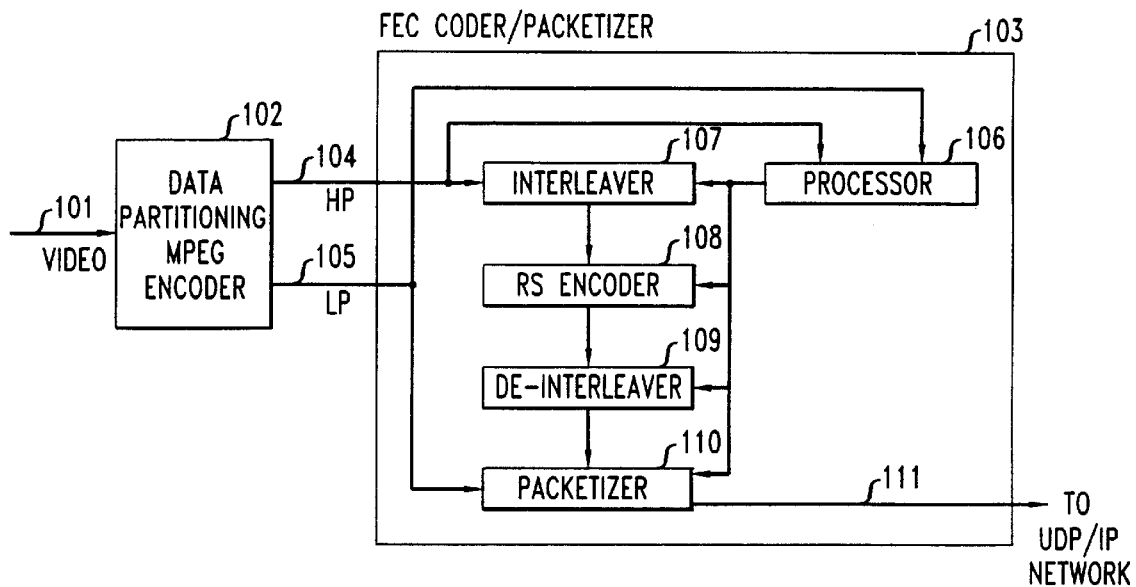
FIG. 2
| PACKET 0 | PACKET HEADER | HP INFORMATION BYTES | LP INFORMATION BYTES |
| PACKET 1 | PACKET HEADER | HP INFORMATION BYTES | LP INFORMATION BYTES |
| PACKET 2 | PACKET HEADER | HP INFORMATION BYTES | LP INFORMATION BYTES |
| PACKET 3 | PACKET HEADER | HP PARITY BYTES | LP INFORMATION BYTES |
FIG. 3
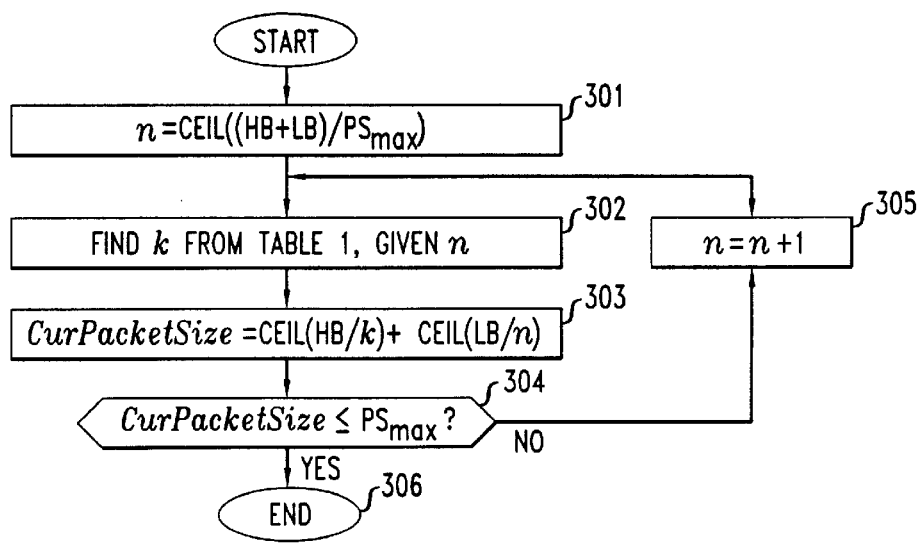

METHOD AND APPARATUS FOR RECEIVING MPEG VIDEO OVER THE INTERNET

CROSS REFERENCE TO RELATED APPLICATIONS

This application describes and claims subject matter that is also described in my United States patent application filed simultaneously herewith and entitled: "METHOD AND APPARATUS FOR TRANSMITTING MPEG VIDEO OVER THE INTERNET", Ser. No. 09/177,088, now U.S. Pat. No. 6,317,462, issued Nov. 13, 2001.

FIELD OF THE INVENTION

This invention relates to the transmission and reception of coded video signals over the Internet, and more specifically, to the transmission and reception of video signals that have been coded using compression efficient inter-frame coding techniques such as those used in MPEG, MPEG-2, H.261, and H.263 standards.

BACKGROUND OF THE INVENTION

With the exploding popularity of the public Internet in the past several years for transporting all types of data, there has been much recent interest in transmitting digitally encoded real-time audio and video over the Internet using the Universal Datagram Protocol (UDP). Because UDP is an unreliable protocol, network packet losses will likely occur and, as a result, will adversely affect the quality of the received audio and video. Recovery from packet losses may be performed solely by the receiver, or better quality can be achieved by involving both the sender and the receiver in the error recovery process. In networks that support prioritization, such as ATM, video quality can be improved in the presence of packet loss by using scalable video coding (see, e.g., R. Aravind, M. Civanlar, A. Reibman, "Packet Loss Resilience of MPEG-2 Scalable Video Coding Algorithms," *IEEE Transactions on Circuits and Systems for Video Technology*, Vol. 6, No. 5, October 1996). There is currently, however, no widespread support for prioritization on the public Internet. Overviews of proposed methods for error recovery for streaming of audio and video over the Internet, which involve both the sender and the receiver are disclosed by C. Perkins and O. Hodson in "Options for Repair of Streaming Media," *Internet Engineering Task Force Internet RFC* 2354, June 1987,and G. Carle and E. Biersack in "Survey of Error Recovery Techniques for IP-Based Audio-Visual Multicast Applications," *IEEE Network,* November/December 1997. While the general methods described in these overviews may be applicable to IP transmission of both audio and video, most of the studies published where specific techniques have been implemented involve audio only. Because of its higher data rates, and propagation of errors through inter-frame coding, it is more difficult to maintain video quality than audio, and audio techniques, therefore, cannot be directly applied to video signals.

Many of the currently popular schemes for transmitting digital video over the Internet, such as Motion-JPEG and wavelet-based schemes, use intra-frame coding. Inter-frame coding techniques, such as those used in MPEG-1, MPEG-2, H.261, and H.263 standards, are generally more compression-efficient than intra-frame techniques. However, the inter-frame standards suffer more from Internet packet loss because errors in one frame may propagate for many frames. An MPEG video sequence includes intra-frame coded (I) frames, and inter-frame predicted coded (P), and bi-directional inter-frame coded (B) frames. I and P frames are used in the prediction of subsequent frames while B frames are not used in the prediction of subsequent frames. For example, consider an MPEG video sequence with I frames occurring every 15 frames. In MPEG coding, because of inter-frame prediction, all predictive P and B frames rely upon the previous I frame. Thus, if an error occurs while transmitting the I frame, the effect persists for 15 frames, or 500 ms, which is quite noticeable to a viewer. The received video quality can be improved both through error concealment techniques that are applied at the decoder, and by error resilience techniques that are applied at the sender.

Error resilience techniques using Forward Error/Erasure Correction (FEC) add redundant data to a media stream prior to transmission, so that packet losses can be repaired at the receiver without requiring contact with or re-transmissions from the sender. Forward Error/Erasure Correction techniques are well suited to multicast applications, because they avoid the use of re-transmissions. The same redundant data can be used to repair the loss of different packets at separate receivers in a multicast group. If re-transmission were used instead, multiple retransmission requests would have to be sent. Forward Error/Erasure Correction techniques for multimedia generally fall into one of two categories, media-independent FEC and media-specific FEC (see, e.g., C. Perkins and O. Hodson, "Options for Repair of Streaming Media," *Internet Engineering Task Force Internet RFC* 2354, June 1998).

In media-independent FEC, well-known information theory techniques for protecting any type of data are used. In, "Media-independent Error Correction using RTP," *Internet Engineering Task Force Internet Draft,* May 1997 by D. Budge, R. McKenzie, W. Mills, and P. Long, several variations of exclusive-OR (XOR) operations are used to create parity packets from two or more data packets. More complex techniques such as Reed Solomon (RS) coding can also be used (see, e.g., G. Carle and E. Biersack, "Survey of Error Recovery Techniques for IP-Based Audio-Visual Multicast Applications," *IEEE Network,* November/December 1997). Reed-Solomon encoding is an example of a systematic forward error/erasure correction code. A systematic forward error/erasure correction code is one in which the information bytes are transmitted in the codeword without modification. Thus, in the absence of channel errors, no Reed-Solomon decoding is necessary to recover the information bytes. When an RS(n,k) codeword is constructed from byte data, h parity bytes are created from k information bytes, and all n=k+h bytes are transmitted. Such a Reed Solomon decoder can correct up to any h/2 byte errors, or any h byte erasures, where an erasure is defined as an error in a known position. When RS coding is applied to protect packetized data against packet loss, k information packets of length j bytes are coded using jRS codewords. For each RS codeword, k information bytes are taken from k different packets (one from each packet), and the h constructed parity bytes are placed into h separate parity packets, and all n=k+h packets are transmitted. Because the transmitted packets are numbered, and packets are assumed to be received perfectly or not at all, the receiver can determine which packets are missing, and thus a packet loss can be considered to be an erasure. Hence, if any h (or fewer) of the n transmitted packets are lost, the original k information packets can be recovered perfectly.

A key advantage of RS coding is its ability to protect against several consecutive errors, depending on the parameter choices. The overhead rate for RS coding is h/k, and it is most efficient for protection against burst errors for large values of k. For example, an RS(6,4) code and an RS(4,2) code both can protect against a burst length of 2 errors. But the RS(4,2) code has 100% overhead, while the RS(6,4) code has only 50% overhead. Reducing the overhead percentage by increasing the block length, however, leads to delay because large block lengths require buffering of large amounts of data prior to transmission.

In media-specific FEC coding unlike in media-independent FEC coding where the multimedia stream is just treated as data, knowledge of the specific type of multimedia stream to be transmitted is used. In "Simulation of FEC-Based Error Control for Packet Audio on the Internet," *INFOCOM,* March 1998, San Francisco, Calif. by M. Podolsky, C. Romer, and S. McCanne, and in "Reliable Audio for Use over the Internet," *Proc. INET* '95, Honolulu, Hl, pp. 171–178, June 1995, by V. Hardman, M.A. Sasse, M. Handley, and A. Watson. a redundant low-bit rate audio stream is transmitted along with the standard audio stream, but delayed by one packet. If a standard audio packet is lost, the receiver uses the low-bit rate version of that audio instead, received in the next packet. This method protects against single packet losses.

In the aforenoted article by Perkins and Hodson, a suggestion is made to combine media-specific and media-independent techniques by applying the media-independent FEC techniques to the most significant bytes of a coder's output, rather than applying FEC over the entire multimedia bitstream. No specific information about how this can be accomplished is given however. A method for adding resilient information to inter-frame coded video, such as MPEG video, in order to protect video quality against packet loss, but which has low overhead and low delay is desirable.

SUMMARY OF THE INVENTION

In accordance with the present invention, an inter-frame coded video signal, such as an MPEG video signal, employs a data splitting function to split such a video stream into a high priority and a low priority partition. Systematic Forward Error/Erasure Correction coding is then performed on only the data in the high priority partition. The Forward Error/Erasure Corrected high priority partition data and the non-Forward Error/Erasure Corrected low priority partition data are then combined into packets and transmitted over the same network to a receiver, where they are decoded. Depending on the degree of protection against errors or erasures offered by the particular FEC code that is used, the loss of one or more packets containing high priority data can be corrected with no loss of data in the high priority partition. The effect of the loss of the low partition data in the lost packet or packets, which low partition is not protected, has much less of a deleterious effect on the quality of the decoded video signal than would the loss of data from the high priority partition data. Advantageously, by limiting the application of the Forward Error/Erasure Correction to only the higher priority partition data, and thus protecting against loss only that "more important data", the overhead requirement is reduced for protection against a given packet loss.

In the preferred embodiment, a Reed Solomon encoder is applied to the high priority data for an entire frame. For each RS(n,k) codeword, one information byte is taken from each of k packets and the constructed parity bytes are placed in h different packets, where n=k+h. Each individual frame's data is arranged in the n equal length packets that contain a combination of: packet headers; high priority data comprising one of either information bytes or parity bytes; and low priority data bytes, the latter comprising only information bytes since no error-correction coding is performed on the low priority data. The same number of bytes of high priority data (information or parity in any one packet) are placed in each of the n equal length packets, and the same number of bytes of low priority data (information only) are placed in these same n packets, which together represent the video frame. Amongst these n equal length packets, k packets only contain high priority partition information bytes and h packets only contain the high priority parity bytes. The parity byte in each high priority byte position in each of theses h packets is formed from the RS(n,k) code as it is applied to the k high priority partition information bytes in a corresponding byte position in the k other high priority partition information-containing packets associated with the frame. Advantageously, arranging the packets in this manner minimizes the amount of overhead and delay for a given packet loss protection rate.

A receiving decoder, upon receiving the packets associated with a frame separates the high priority partition bytes and low priority partition bytes in each packet according to the numbers of such bytes or each type included within each packets, which numbers are transmitted in the packet headers. RS(n,k) decoding is applied byte position-by-byte position across the high priority partition portion within the received packets. If up to h of the n frame packets are lost, the RS decoding process recovers each high priority byte in the lost packet or packets. Full reconstruction of the high priority partition information bytes that were transmitted in the k packets of the n packets that contained high priority partition data is thus effected. Although the low priority partition data in the lost packets is unrecoverable, the fully recovered high priority partition data enables the video picture to be decoded, albeit in what might be at a reduced quality level for that frame or that portion of a frame in which only the high priority partition information is available.

BRIEF DESCRIPTION OF THE DRAWING

FIG. 1 is a block diagram of first embodiment of a video encoder in accordance with the present invention which uses a data partitioning MPEG encoder to code and split the coded video signal into HP and LP partitions;

FIG. 2 the arrangement of HP data and parity information, and LP data within the packets associated with a frame for an example of RS(4,3) encoding;

FIG. 3 is a flow chart that details the steps for determining the n and k parameters associated with a frame as a function of the number of LP and HP bytes in the frame;

DETAILED DESCRIPTION

Figure 4:
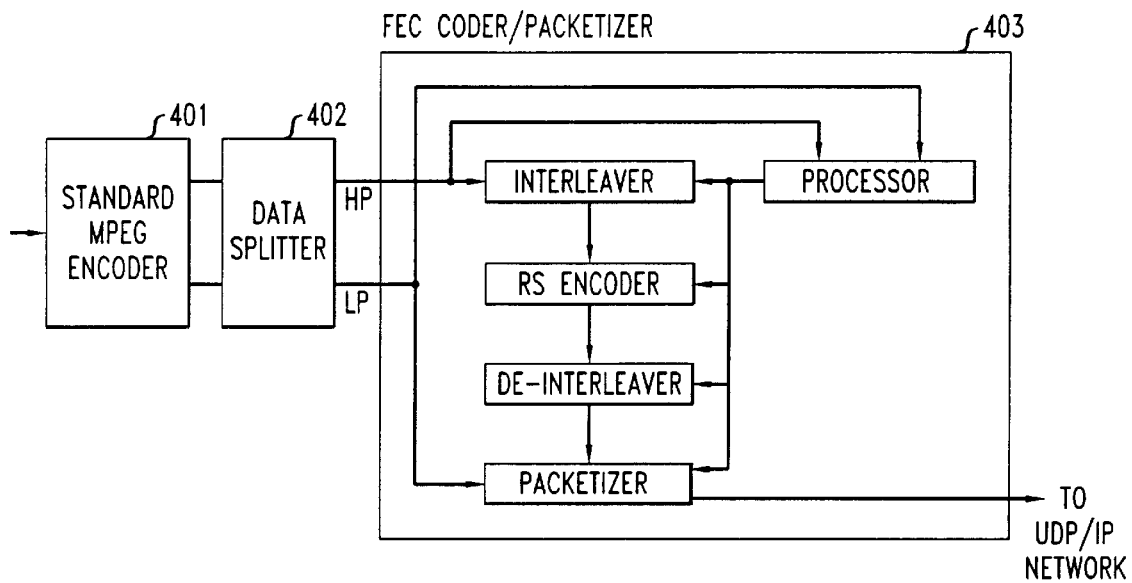
FIG. 4 is a block diagram of a second embodiment of a video encoder in accordance with the present invention in which a standard MPEG encoder is used to encode the video signal and a data splitter divides the coded signal into HP and LP partitions.

The MPEG-2 standard (ITU-T*Recommendation H.262*, "GENERIC CODING OF MOVING PICTURES AND ASSOCIATED AUDIO INFORMATION", July 1995) includes several means for performing scalable video coding, including spatial scalability, SNR scalability, and data partitioning. In scalable video coding, receivers with different available bandwidths can receive and decode appropriate representations of coded video, by receiving a base layer, and if bandwidth is available, receiving one or more enhancement layers. The more layers received, the higher the quality of the decoded video. In the aforenoted paper by Aravind, Civanlar and Reibman, data partitioning was applied to provide protection against packet loss for transmitting an MPEG-coded video signal in a network that supports prioritization such as ATM. Specifically, protection against packet loss was shown to be achievable by transmitting the base layer at a higher priority than the enhancement layer(s). Since the public Internet does not currently support prioritization of packets this technique cannot be applied to the transmission of coded video over the Internet.

The inventor has recognized, however, that an advantage can be achieved by using, in a non-prioritized network, such as the public Internet, a data splitting functionality that is used in the prior art for packet protection over a network that does support prioritization. By incorporating a data splitting functionality together with a Forward Error/Erasure Correction functionality for transmitting an inter-frame compression-coded video signal over a non-prioritized public Internet, the amount of overhead needed for packet protection is reduced, while achieving the improvement in the subjective video quality that packet protection affords. Further, by combining high priority and low priority data in the same packets, the delay for equal overhead and protection is advantageously reduced.

FIG. 1 is a first embodiment of an encoder in accordance with the present invention. In this embodiment of the present invention, an encoder which is compliant with MPEG-standardized data partitioning is used to split an incoming video data stream into a high priority partition and a low priority partition. With reference to FIG. 1, an incoming video data stream on 101 is inputted to a such a compliant data partitioning MPEG-standardized encoder 102 which, in accordance with the standard, such as the MPEG-2 data partitioning standard, compression-codes the input video bitstream and splits the compression-coded bitstream into two output layers. The first layer is the base layer, referred to herein as the high priority (HP) partition. The second layer is the enhancement layer, referred to herein as the low priority (LP) partition.

As is well known to one skilled in the art of MPEG coding, an MPEG-coded video bitstream includes headers at the sequence level, at the group-of-picture (GOP) level, at the picture (frame) level, and at the slice level. As is well known, a slice consists of a group of adjacent macroblocks, where each macroblock in itself consists of a group of four adjacent luminance blocks of data and two chrominance blocks. At the picture level, a frame is classified as being as an intra-frame coded (I) frame, an inter-frame coded predictive (P) frame, or a bi-directional inter-frame predictive (B) frame. At the macroblock level, for the predictive-type P and B type frames, information is included which indicates whether the macroblock is inter or intra coded with respect to another frame, as well as motion vector information. The information at the block level includes low frequency and high frequency discrete cosine transformation (DCT) coefficients derived from actual pixel information.

In accordance with MPEG standards, data partitioning can be effected at a plurality of different priority breakpoints, such as above the macroblock layer, at the macroblock layer, or within the macroblock layer. Generally, the more critical parts of the coded bitstream, such as the headers, the motion vectors and the low frequency DCT coefficients, are allocated to the HP partition, and the less critical data, such as the higher frequency DCT coefficients, are allocated to the LP partition. In accordance with the standard, a priority breakpoint can be chosen for each slice, which determines which codeword types are arranged into which partition.

In the embodiment of the invention in FIG. 1, which uses the standardized data-partitioning MPEG encoder 102, priority breakpoints are determined in accordance with the type of frame (I, P, or B) in the data stream that is being partitioned. Specifically, in this embodiment, for each I frame, all the data is placed in the HP partition, with no data being placed in the LP partition. Other embodiments may divide the data from each I frame between the HP and LP partitions. For each B frame, as much frame data as the MPEG standards relating to data partitioning allows is placed in the LP partition, with the remaining data placed in the HP partition. For each P frame, frame data is divided between the HP and LP partitions so that data elements through the first two DCT coefficients of each block are placed in the HP partition, with the higher order DCT coefficients placed in the LP partition. Different priority breakpoints in the three frame types between the LP and HP partitions other than described above for this embodiment could equally be used. It would be expected, however, that a higher breakpoint would be used for I frames than for P frames, which, in turn, would be higher than the breakpoint for B frames. In this standards-compliant embodiment, sequence, GOP, and picture headers are copied into both partitions for error resilience.

In accordance with the invention, the HP partition is encoded with a systematic Forward Error/Erasure Correction code. Specifically, in this preferred embodiment, Reed Solomon coding is applied to the HP data for a single frame across the entire frame. For this embodiment, only data from a single frame is operated upon by a Forward Error/Erasure Correction encoder/packetizer 103 at a time to minimize delay that would be incurred if data from multiple frames needed to be accumulated before being coded and transmitted. In other embodiments, B frames as well as their immediately following anchor frame (I or P) may be operated upon together by the Forward Error/Erasure Correction encoder/packetizer 103.

Reed Solomon encoding is applied to the HP data output of the MPEG encoder 102 for the frame. As will be described in detail hereinafter, the number of bytes in the HP partition and the number of bytes in the LP partition are used together and separately, together with a maximum allowable packet length and a desired degree of packet protection, to determine the number of equal-length packets, n, into which, for that frame, the HP information bytes, the LP information bytes, and the protective HP parity bytes will fit. In accordance with the invention, each of the n equal-length packets contains a combination of both LP information bytes, and one of HP information and parity bytes. The parity bytes are determined by forming an RS(n, k) codeword by taking one HP information byte from each of k packets that contain the HP information bytes and placing the h parity bytes constructed from these k bytes, one byte at a time, into h different packets, where n=k+h. Thus, the parity bytes in those h packets in byte position m (where m varies between 1 and the number of HP information bytes in a packet) are derived from the HP information bytes in that same byte position m in the k packets. Since the parity bytes in each byte position in those h packets are calculated from the HP information bytes in the same byte positions in the other k packets, each equal-length packet contains an equal number of HP data bytes, the latter being either all information bytes or all parity bytes. It follows, therefore, that each equal-length packet then contains an equal number of LP information bytes. Because the number of HP information bytes in the frame is not necessarily divisible by the number of k packets, padding bytes are added, as necessary, at the end of the $k^{th}$ packet. Similarly, padding bytes may be applied to the $n^{th}$ packet for LP information bytes.

FIG. 2 shows an example of an arrangement of a frame group of packets for an RS (4, 3) code. As can be noted, three packets (k=3) contain HP information bytes information bytes and LP information bytes. One packet (h=1) contains the HP parity bytes and the LP information bytes. Arranging the packets in the manner illustrated by this figure minimizes the amount of overhead for a given packet loss protection rate without adding to delay. The packet header in each packet contains the packet number, the number of the packets in the frame group of packets (n), the number of packets with parity data in the frame group of packets (h), the temporal reference value for the frame, the frame type (I, P, or B), the HP/LP priority breakpoints, and the number of HP and LP bytes in each packet.

With reference back to FIG. 1, the output of the data partitioning MPEG encoder 102 consists, for an input stream of video data associated with a frame, of two data streams, an HP partition data stream on output 104 and a LP partition data stream on output 105, both of which are inputted to the FEC Coder/Packetizer 103. The number of bytes in the HP partition of the input frame, HP#, and the number of bytes in the LP partition of the input frame, LP#, are inputted to a processor 106 within coder/packetizer 103. As will be described in detail hereinafter, processor 106, using the values HP# and LP#, together with a predetermined maximum number of bytes per frame, determines the number of packets, n, needed to transmit the entire frame, including packet headers, the HP partition information bytes, the HP partition parity bytes, and the LP partition information bytes. Further, processor 106 determines the number of packets, h (equal to n-k), which are needed to protect the HP partition information bytes in the other k packets for a desired level of protection. Processor 106 also determines the byte-length of each of the n packets. Processor 106 then determines the numbers of HP data or parity bytes and LP data bytes to be apportioned into each of these n packets, with LP information bytes allocated to each of the n packets, HP information bytes being allocated to the k packets, and HP parity bytes being allocated to the other h packets, as per the example shown in FIG. 2.

Once processor 106 has determined all the parameters that determine the configuration of each packet and the number of such packets, a Reed Solomon RS(n,k) encoding is effected, byte by byte on the bytes within the HP partition. Specifically, the HP partition video stream is inputted to a byte interleaver 107, which in response to the parameters determined by processor 106, forms sequential codewords that are inputted to a Reed Solomon encoder 108. For example, if the number of HP bytes per packet are calculated to be 650, the $1^{st}$, $651^{st}$, $1301^{st}$, et seq., bytes in the HP stream are interleaved by interleaver 107 to form an input word to RS encoder 108 in order to determine the bytes for the first parity byte position for the h packets which are to contain HP parity bytes. The $2^{nd}$, $652^{nd}$, $1302^{nd}$, et seq., bytes are then interleaved to form the next input word to RS encoder 108 to determine the parity bytes for the second parity byte position for the h HP parity packets. In such a manner, the RS encoder 108 is sequentially presented with a series of k-byte input words, each byte in each k-byte input word comprising one information byte from what will be, when re-interleaved, k different packets. For each k-byte input word, h parity bytes are determined. Thus, for each k-byte input word, RS encoder 108 outputs an n-byte word containing k information bytes and h parity bytes.

In order to reassemble these vertically oriented codewords, each containing bytes properly belonging in n different packets, back into a row-oriented packet format, a de-interleaver 109 sequentially places each byte from each n-byte output word into a separate one of n different rows. The first k of such n rows thus contain all HP information bytes and the last h of such rows contain all HP parity bytes. When the n rows are reconstructed, each such row is combined by a packetizer 110 with a packet header and the calculated fixed number of LP partition information bytes apportioned to each packet from the LP output 105 of the data partitioning MPEG encoder 102. Each packet, then in a format as shown in FIG. 2 for the illustrative example for an RS(4,3) code, is sequentially outputted on output 111 for transmission onto a UDP/IP network.

For the example of FIG. 2, if none of the packets containing the frame information are lost in transmission, the decoded video will be perfectly decoded (i.e., identical to that encoded). If one of the packets (or up to h packets in the general case for R(n,k) coding) is lost, then all of the HP information in that packet is recoverable using a Reed Solomon decoder. The LP information data in the lost packet could not, however, be recovered since it is not protected. The portions of the picture that correspond to the macroblocks whose LP data was received will, however, be perfectly decoded, and those that correspond to macroblocks whose LP data is lost will decode only the HP data for those macroblocks. Those macroblocks which are decoded using only HP data may be noticeable to a viewer, but are unlikely to be visually offensive as long as the HP/LP priority breakpoint is properly chosen. The exact visual quality of macroblocks decoded using only HP data depends on this HP/LP priority breakpoint, as well as the characteristics of the video source material. In the embodiment of FIG. 1 in which a standardized data partitioning MPEG encoder 102 is used to compression-code the input video stream and form the HP and LP partitions, the lowest level header copied into both partitions is the picture header. Thus, once any packet is lost, and with it the LP partition information contained therein, which cannot be recovered, the LP partition data that is received in the next received packets cannot be properly incorporated into the decoding process since there is no identifiable spatial entry point with which that received data can be associated until a next picture header is received. Thus, with the embodiment of FIG. 1, the perceptual effect of lost LP partition information will extend until a packet is received that contains a next picture header within the received LP partition information. Once that picture header is received, the LP partition data that follows can be properly incorporated with the received HP partition data.

As previously noted, the exact arrangement of the frame data into packets is a function of the number of bytes of HP partition information and LP partition information in the frame, the parameters of the RS(n,k) code, and the maximum packet size. For Internet Protocol (IP) transmission, the maximum packet size is set, for this embodiment, to the Ethernet Maximum Transport Unit (MTU) size of 1500 bytes. The choice of the RS(n,k) code parameters depends on the number of packets needed to transmit the frame, on the network loss conditions, and the overhead percentage considered acceptable. Because Internet packet loss has a tendency to be somewhat bursty, the k/n ratio can be chosen to be lower for lower values of n and higher for higher values of n. Table 1 is an example of pairs of n and k values in which, based on the bursty nature of packet loss, the ratio k/n is set lower for lower values of n and higher for higher values of n.

TABLE 1

| n | k |
|---|---|
| 2 | 1 |
| 3 | 2 |
| 4 | 3 |
| 5 | 4 |
| 6 | 4 |
| 7 | 5 |
| 8 | 6 |
| 9 | 6 |
| 10 | 7 |
| 11 | 8 |
| 12 | 9 |
| 13 | 9 |
| 14 | 10 |
| 15 | 11 |

Given a list of (n,k) values such as that given in Table 1, the particular (n,k) pair to use for each frame can be determined using an iterative process. FIG. 3 is a flowchart that details the steps that processor 106 follows for determining the these parameters. After the data partitioning MPEG Encoder 102 splits the bitstream into the HP partition and the LP partition, there are HP# bytes in the HP partition and LP# bytes in the LP partition. At step 301, an initial estimate is formed for the number of packets, n, needed to transmit this information, assuming a maximum packet size $PS_{max}$, which in this embodiment is equal to the Ethernet MTU size minus the number of packet header bytes used. This initial estimate of n is formed from n=ceil (HB#+LB#)/$PS_{max}$, where ceil ( ) is the ceiling function. This initial estimate of n is calculated without consideration of the HP parity bytes, which must be incorporated into the frame. The value of k that corresponds to the current estimate of n is retrieved, at step 302, using Table 1. At step 303, the necessary packet size for the HB# information bytes is calculated from CurPacketSize=ceil (HB#/k)+ceil (LB#/n), because the HB# information bytes are split among k packets (with parity bytes in the remaining h packets) and the LB# information bytes are split among n packets. At step 304, CurPacketSize is compared with $PS_{max}$. If CurPacketSize is smaller than $PS_{max}$, the current (n,k) parameters may be used. If not, the packet size is too large, and n is incremented at step 305. Table 1 may yield a new k for this incremented value of n. CurPacketSize is then recalculated using these new parameters. The process ends at step 306 when the resultant parameters yields a CurPacketSize of less than $PS_{max}$. The actual number, HBP, of HP bytes (information or parity) in each of the n frames is then equal to ceil (HB#/k) and the actual number, LPB, of LP information bytes in each of the n frames is equal to ceil (LP#/n), the total number of bytes, less the length of the packet header, in each frame, TPB, thus being equal to HBP+LPB.

As an illustrative example, a P frame will be assumed to have a size of 5632 bytes, in which HB#=2129 HP bytes and LB#=3503 LP bytes. $PS_{max}$ is assumed to be equal to 1475 bytes, derived from a 1500 byte MTU size minus 25 bytes for a packet header. The initial estimate of the number of packets is n=ceil ((2129+3503)/1475)=ceil(3.818)=4. From Table 1, for n=4, it is seen that k=3. Using these parameters, HPB, LPB and TPB are calculated: HPB=ceil (2129/3)=710; LPB=ceil (3503/4)=876; and TPB=710+876=1586, which is greater than $PS_{max}$ of 1475. Thus, that set of parameters is not valid and another iteration is necessary. For this next iteration, n is incremented to 5. From Table 1, for n=5, it is seen that k=4. Using these parameters, HPB, LPB and TPB are calculated: HPB=ceil(2129/4)=533; LPB=ceil(3503/5)= 701; and TPB=533+701=1234, which is less than $PS_{max}$ of 1475.

Once the parameters of n, k, HPB and LBP are determined for the frame, the aforedescribed Reed Solomon coding and arrangement of the HP information and parity bytes, and LP information bytes into packets can be effected. Specifically, once processor 106 determines these parameters from the partitioned HP and LP data for each frame, that frame's data is interleaved, RS encoded, de-interleaved and packetized for transmission over a UDP/IP network, as previously described.

In the embodiment of FIG. 1, a data partitioning MPEG encoder 102 was used to split the bitstream into the HP and the LP partitions. FIG. 4 is a block diagram of an alternative embodiment which although not maintaining strict MPEG compliance, in order to reduce overhead and improve performance, can still be used with standards compliant MPEG encoders and decoders. This embodiment may be applied to MPEG-1 or MPEG-2 video, as well as other similar video coding standards such as H.261 and H.263. In this embodiment a standard MPEG encoder (or other standard encoder) 401 compression codes the input video stream. A data splitter 402 then divides the compression-coded output of encoder 401 into HP and LP partitions. For purposes of the present invention, the combination of the standard MPEG encoder 401 with a data splitter 402 enables the splitting function to be performed more efficiently and with improved performance as compared to the data partitioning MPEG encoder 102 in FIG. 1. Specifically, only slice headers are duplicated in both partitions and all other data is placed in one partition or the other, but not both. Because of the frame alignment of packets and the containment of frame information in the packet headers themselves, it is not necessary to duplicate the picture headers and above in each of the partitions, thereby minimizing overhead. By providing slice headers in both the LP and HP partitions, however, a point of entry is provided for the LP data upon a packet loss. Thus, in a received packet that follows a lost packet, the LP data can be incorporated into the decoded picture after the decoder receives, with the LP partition data, the next slice header. Advantageously, as compared the embodiment of FIG. 1, in which the point of insertion for the received LP data following a packet loss was the next frame, the embodiment of FIG. 4 provides a point of insertion for the LP data at the next slice, thereby improving the picture quality of the decoded video signal.

As previously described, the data partitioning MPEG encoder 102 partitions I frames so that all frame data is placed in the HP partition to minimize the effect of an error in an I frame from propagating to other frames. Since B frames are not used for prediction, as much data as is possible via the data partitioning standard is placed in the LP partition. In the embodiment of FIG. 4, all data for all B frames is placed in the LP partition as opposed to the embodiment of FIG. 1 in which some data, in accordance with the standards, is required in the HP partition. In both the embodiment of FIG. 1 and FIG. 4, the P frame data is divided between the HP and LP partitions in the manner described above. Within each P frame macroblocks can be either inter-frame or intra-frame coded. In the embodiment of FIG. 4, different priority breakpoints are chosen for inter and intra coded macroblocks in each P frame, which the data partitioning MPEG encoder 102 in FIG. 1 could not do. Inter-coded macroblocks decoded using only the HP partition (and not the LP partition) may retain high frequency information from the corresponding motion-compensated macroblocks in the previous frame, while intra-coded macroblocks may not. Hence, it is desirable to set the priority breakpoint for intra-coded macroblocks to include more DCT coefficients in the HP partition than are included in inter-coded macroblocks. Advantageously, this reduces the overhead rate for given level of quality or improves the quality for the same overhead rate.

The HP and LP outputs of data splitter 402 are applied to a FEC coder /packetizer 403, which functions in the same manner as FEC coder/packetizer does in FIG. 1, which functions have been described above. The packets outputted by FEC coder/packetizer 403 are then transmitted over a UDP/IP network.

Although the embodiment in FIG. 4 includes a separate standard MPEG encoder 401 and data splitter 402, it should be recognized that a data coder that supports the described data splitting operation could equally perform the same functions that encoder 401 and splitter 402 together do.

The encoder networks in FIG. 1 and FIG. 4 transmit output packets over a UDP/IP network such as the public Internet, to corresponding decoders connected to that network. In the case of a multicasting encoder, the transmission may be simultaneously broadcast to a plurality of end-users who will each receive the transmitted information. Since different packets may be lost along the routes to different of such end-users, the FEC techniques employed in the present invention to protect against packet loss enable each individual decoder to recover the particular packets that may have been lost on the path to that end-user up to, of course, the level of packet protection provided by the specific RS code used by the encoder.

Figure 5:
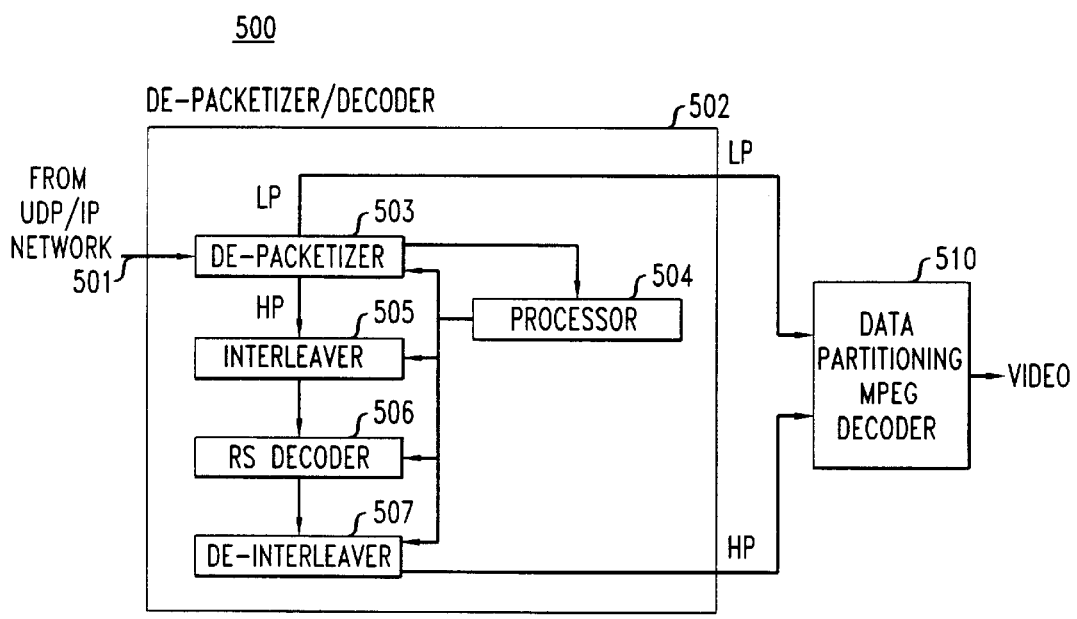
FIG. 5 is a block diagram of an embodiment of a video decoder in accordance with the present invention in which lost packets are reconstructed, HP and LP partitions reformed, and a data partitioning MPEG decoder is used to decode the video signal from the HP and LP partitions.

A decoder network 500 that is associated with the encoder network of FIG. 1 is illustrated in FIG. 5. As a data partitioning MPEG encoder 102 is incorporated within the encoder network of FIG. 1, the decoder network of FIG. 5 incorporates a complimentary data partitioning MPEG decoder 510. In FIG. 5, the serial packets transmitted by the encoder network over the UDP/IP network 501 are inputted to a de-packetizer/decoder 502. De-packetizer/decoder 502 includes a de-packetizer 503 which receives the serial packets and strips the header information in each packet and passes it to a processor 504. The packet header information includes: a packet number; a frame number; the type of frame (I, B, P); the (n,k) parameters which define the packet structure of the frame; and the number of HP partition bytes, HPB, and LP partition bytes, LPB, in each packet. Processor 504, from the header information, determines the start of the frame, and from the parameter n, "knows" that that many packets are used to define the frame. Further, from the packet numbers received, processor 504 determines which particular of those n packets, if any, are missing and their position within the sequence of these n packets. In response to receiving all such information from processor 504, de-packetizer 503 strips off the packet header of each packet within the frame and divides the data in each packet into its HP and LP portions. For those packets which are determined to be missing, de-packetizer 503 inserts "0" bytes or an error code in the HP and LP data streams. The HP serial byte stream output of de-packetizer 503 consists of n sub-packets-worth of HP data, each sub-packet containing HPB bytes. This HP stream is inputted to an interleaver 505 to decode the RS(n,k) encoded words that exist across the sub-packets and to replace any missing data from up to h lost packets. Thus, for each byte position across the sub-packet, a byte is selected from each such sub-packet at that byte position to form an input word to an RS decoder 506.

As an example, using the frame structure shown in FIG. 2 where n is equal to 4 and k is equal to 3, and with HPB being equal 650 bytes, interleaver 505 selects the $1^{st}$, $651^{st}$, $1301^{st}$ and $1951^{st}$ bytes in the HP byte stream to form a 4-byte input word to RS decoder 506 to determine the 3-byte corresponding output word, each byte in the three-byte output word being an HP information byte in the first byte position in each of the three information sub-packets. Interleaver 505 then presents the $2^{nd}$, $652^{nd}$, $1302^{nd}$ and $1952^{nd}$ bytes in the HP byte stream to RS decoder 506 to determine the bytes in the second byte position in each of the three information sub-packets. Interleaver 505 similarly processes the $3^{rd}$ through the $650^{th}$ bytes. The three information bytes for each byte position are thus sequentially outputted by RS decoder 506. Since the RS(4,3) code is capable of correcting up to one erasure, if one of the four packets is lost and thus not received by the decoder network 500, RS decoder 506 will determine the missing byte in each of the byte positions in the lost HP sub-packet. Thus, if processor 504 determines that the third packet is lost, "0" bytes are inserted in each byte position from the $1301^{st}$ through the $1950^{th}$ bytes in the HP byte stream. Processor 504 passes the location of these missing bytes to RS decoder 506, which when sequentially presented with the bytes from the three received packets, recovers each missing byte in each byte location in the third packet. Thus, RS decoder 504 is able to recover the entire sub-packet of HP data in the single lost third packet. If more than one packet is lost in this example, or more than h packets in the general case, then RS decoder is unable to recreate the missing data and a sequence error code that can be recognized by the data partitioning MPEG decoder 510 is inserted in the HP byte stream in place of the recovered data.

Since RS decoder 506 outputs a k-byte word for each n-byte input word, in which each of the k bytes is associated with a different sub-packet, de-interleaver 507 re-sequences each k-byte output word, one byte at a time, into k separate HP sub-packets to reformulate the HP information in each transmitted packet. The HP information in these k sub-packets that is re-created and, if necessary, recovered, is outputted by de-interleaver 507 and inputted on a first input of the data partitioning MPEG decoder 510. Where lost packets are unrecoverable, the data stream contains sequence error codes.

The LP information in the n LP sub-packets derived by de-packetizer 503 is simultaneously inputted on a second input of data partitioning MPEG decoder 510. For those packets that are lost, the LP data cannot be recovered since forward error/erasure correction was not applied to the LP partition. For those packets, therefore, the LP output of de-packetizer 503 includes a codeword that will be recognized by the data partitioning MPEG decoder 510 as being indicative of missing data.

The LP and HP data stream inputs to data partitioning MPEG decoder 510 are equivalent, in the absence of any lost packets, to the HP and LP data stream outputs of the data partitioning MPEG encoder 102 in FIG. 1. If up to and including h packets are lost, the HP data stream inputted to decoder 510 is equivalent to the HP data stream outputted by encoder 102 and the LP data stream inputted to decoder 510 includes codewords marking lost data. When more than h packets are lost so that RS decoder 506 cannot recover the lost HP data, both the HP and LP data stream inputted to data partitioning MPEG decoder 510 have missing data, the HP data stream including sequence error codes indicating the absence of actual data and the LP data stream including the recognizable codewords indicating lost data.

Data partitioning MPEG decoder 510, in response to the inputted LP partition data and the HP partition data decompresses and reformulates the transmitted video data in accordance with its standardized algorithm. Where, with respect to specific pels in the frame, corresponding HP data is available (by being actually received or recovered) but LP data is not available, the subjective video quality of the reconstructed video frame is degraded. Furthermore, that spatial portion of the reconstructed video frame that follows, in a scanning sense, those pels in the frame associated with the lost LP partition data, is also degraded since the LP partition data in the next received packet cannot be associated with specific spatial points within the frame and thus with the HP data. As noted, only picture headers are included within both the HP and LP partitions. Thus, until the next picture header is received, all LP partition data within the video frame that follows a lost packet will be unable to be combined with spatially corresponding HP data to decode and reconstruct the video signal. Further, since the type of frames in this embodiment which are divided into separate HP and LP partitions are the P frames, which are used to predict the next frame, the loss of LP data for reconstructing the remainder of the frame will have an effect on the quality of the next P and B frames, albeit at a substantially reduced level as compared to the effect that a total loss of data would have caused without the present invention in which the more important HP partition data has been protected. In the event that more than h packets are lost in transmission, both HP and LP partition data is lost and not recoverable. Standard error concealment techniques can then be used to minimize the degradation in video quality.

Figure 6:
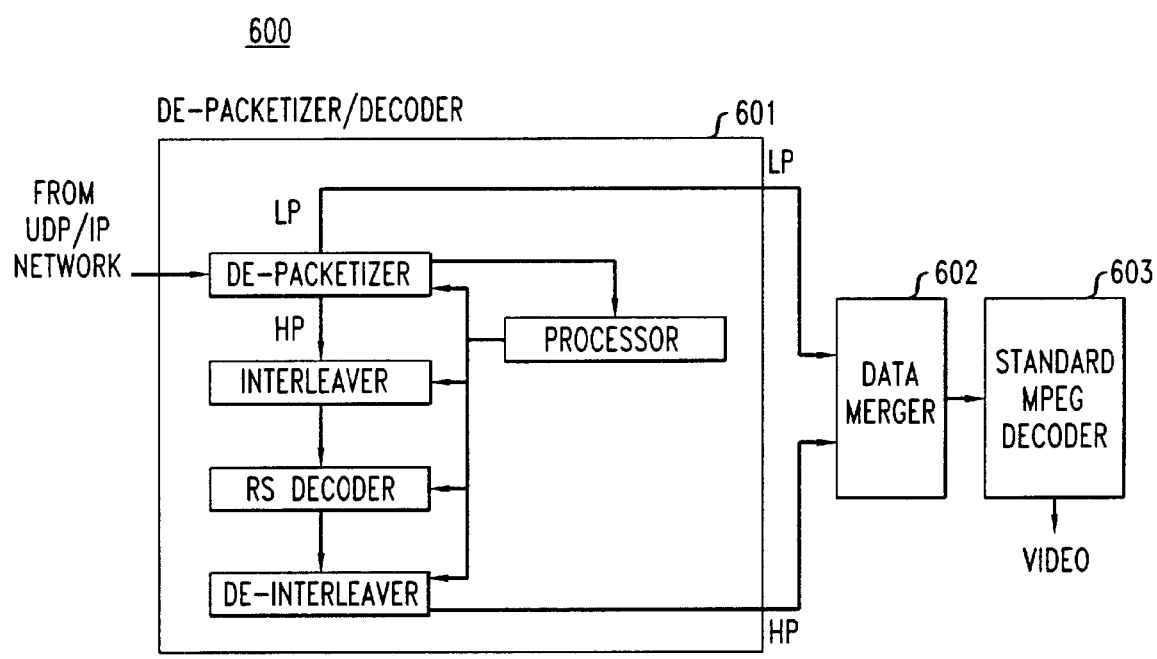
FIG. 6 is a block diagram of a second embodiment of a video decoder in accordance with the present invention in which a data merger combines the HP and LP partitions, which are then inputted to a standard MPEG decoder to decode the video signal.

A decoder network 600 which is associated with the encoder network of FIG. 4 is illustrated in FIG. 6. In this embodiment of a decoder network, a de-packetizer/decoder 601 receives from the UDP/IP network the data stream that was transmitted by encoder network of FIG. 4. De-packetizer/decoder 601 functions in a manner identical to that of de-packetizer/decoder 502 in FIG. 5 and includes the same elements as those described in connection with the description above of FIG. 5. The de-packetizer, interleaver, RS decoder, de-interleaver and processor will not, therefore, be discussed in detail. The outputs of de-packetizer/decoder 601 are the LP and HP partition data streams, as are the outputs of de-packetizer/decoder 502 in FIG. 5. In the absence of any lost packets in a frame, the LP and HP partitions are equivalent to the HP and LP outputs of data splitter 402 in the encoder network of FIG. 4. If one through h packets are lost, then any lost HP data is recovered and the HP data stream is equivalent to the output of data splitter 402. The LP stream outputted by de-packetizer/decoder 601 includes, however, a codeword indicating that LP data has been lost. Where more than h packets are lost, then both the HP and LP data streams include error codes. Alternatively, the de-packetizer/decoder 601 could send information to a data merger 602 indicating the positions of missing HP and LP information.

The LP and HP data streams outputted by de-packetizer/decoder 601 are inputted to the data merger 602, which combines these data streams into a single data stream having a format which is decodable by a standard MPEG decoder 603. MPEG decoder 603, using its standard algorithm, decompresses the coded video signal to reconstruct the digital video signal, which can then be transformed to an analog video signal and displayed on a video terminal.

As earlier noted in connection with the description of the encoder in FIG. 4, slice headers are included in both the LP and HP partitions outputted by data splitter 402. Thus, the for decoder in FIG. 6, upon a loss of a packet and its LP data, a point of entry can be located for the LP data received in subsequent packets upon detection of the next slice header in such data. Thus, unlike the embodiment of the decoder in FIG. 5 in which, as noted, received LP data could only be reincorporated with HP data upon receipt of the next picture header for the next frame, the embodiment of FIG. 6 enables the LP data received in those packets following a lost packet to be incorporated with received or recovered HP data at a point of entry at the next slice header. Therefore, only that portion of the frame that is associated with the lost LP data until the next received slice header will be degraded, rather than the entire remainder of the frame as in the embodiment of FIG. 5. Further, by minimizing the visually degraded portion of the decoded frame, the degradation of the subsequent frames that may be predicted based on that frame is also minimized.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language that have been recited hereinabove are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements that made hereinabove reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, and the like represent various processes which may be substantially represented in computer readable medium and so executed by a computer or processor, whether or not such computer or processor is explicitly shown.

The functions of the various elements shown in the FIGS. described above, including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage.

Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent to those shown herein.

What is claimed is:

1. A method of decoding a compression-coded video signal that has been packetized and transmitted over a packet-based network in a sequence of packets that are associated with at least one frame of the compression-coded video signal, the method comprising the steps of:

receiving packets associated with the at least one frame of the compression-coded video signal, each of the received packets containing both low priority partition information bytes and forward error/erasure correction (FEC)-coded high priority partition data bytes associated with the at least one frame of the compression-coded video signal, the compression-coded video signal having been split into low priority and high priority partitions before being packetized and transmitted;

determining which transmitted packets associated with the at least one frame of the video sequence have not been received;

applying a FEC decoding to the FEC-coded high priority partition data bytes in the received packets to determine high priority partition information bytes associated with the at least one frame, the step of applying a FEC decoding reconstructing high priority partition information bytes in those packets determined not to have been received;

combining the received low priority partition information bytes and the decoded and reconstructed high priority partition information bytes; and decompression-decoding the combined received low priority partition information bytes and the decoded and reconstructed high priority partition information bytes to reproduce the at least one frame of the video signal.

2. The method of claim 1 wherein the packet-based network is the Internet.

3. The method of claim 1 wherein the received FEC-coded high priority partition data bytes are coded with a systematic forward error/erasure correction code, the received FEC-coded high priority partition data bytes comprising a combination of the high priority partition information bytes associated with the at least one frame and associated parity bytes.

4. The method of claim 3 wherein each received packet has an equal length, the high priority partition data bytes in each received packet comprising either all high priority partition information bytes associated with the at least one frame or all parity bytes.

5. The method of claim 4 wherein an equal number of low priority partition information bytes are in each received packet and an equal number of high priority partition data bytes are in each received packet.

6. The method of claim 5 wherein for each high priority byte position associated with the received packets, high priority partition information bytes in the same high priority byte position from each received packet containing high priority partition information bytes, one byte per packet, are associated with at least one parity byte in the same byte position in one or more received packets containing parity bytes, the FEC decoding being applied to the high priority partition information bytes and associated at least one parity byte at each high priority byte position, one byte position at a time, to determine high priority partition information bytes in each high priority byte position in a packet that was not received.

7. The method of claim 6 wherein the FEC-coded bytes are coded with a Reed Solomon code and the FEC decoding uses Reed Solomon decoding.

8. The method of claim 6 further comprising the steps of:

determining the number of packets (n) in which the at least one frame of the compression-coded video signal has been packetized and transmitted; and determining of the n transmitted packets, the number of packets (k) transmitted containing both high priority partition information bytes associated with the at least one frame and low priority partition information bytes.

9. The method of claim 8 wherein the FEC decoding uses Reed Solomon (n,k) decoding.

10. The method of claim 8 wherein the received packets associated with the at least one video frame of the video signal are protected against a packet loss over the packet-based network of high priority partition information bytes in up to (n-k) packets.

11. The method of claim 6 wherein the step of decompression decoding the video signal uses MPEG decoding.

12. A decoder for decoding a compression-coded video signal that has been packetized and transmitted over a packet-based network in a sequence of packets that are associated with at least one frame of the compression-coded video signal, the decoder comprising:

a depacketizer connected to receive packets associated with the at least one frame of the compression-coded video signal, each of the received packets containing both low priority partition information bytes and forward error/erasure correction (FEC)-coded high priority partition data bytes associated with the at least one frame of the compression-coded video signal, the compression-coded video signal having been split into low priority and high priority partitions before having been packetized and transmitted, the depacketizer separating the FEC-coded high priority partition data bytes and the low priority partition information bytes;

a FEC decoder connected to receive and decode the FEC-coded high priority partition data bytes; and a video decompression decoder connected to receive the depacketized low priority partition information bytes and the FEC-decoded high priority partition data bytes, the video decompression decoder combining and decompression-decoding the low priority partition information bytes and the FEC-decoded high priority partition data bytes.

13. The decoder of claim 12 wherein the packet-based network is the Internet.

14. The decoder of claim 12 wherein the FEC-coded high priority partition data bytes are coded with a systematic FEC code, the received FEC-coded high priority partition data bytes comprising a combination of the high priority partition information bytes associated with the at least one frame and associated parity bytes.

15. The decoder of claim 14 wherein each received packet has an equal length, the high priority partition data bytes in each received packet comprising either all high priority partition information bytes associated with the at least one frame or all parity bytes.

16. The decoder of claim 15 wherein an equal number of low priority partition information bytes are in each received packet and an equal number of high priority data bytes are in each received packet.

17. The decoder of claim 16 wherein for each high priority byte position associated with the received packets, high priority partition information bytes in the same high priority byte position from each received packet containing high priority partition information bytes, one byte per packet, are associated with at least one parity byte in the same byte position in one or more received packets containing parity bytes, the FEC decoder decoding the high priority partition information bytes and associated at least one parity byte at each high priority byte position, one byte position at a time, to determine high priority partition information bytes in each high priority byte position in a packet that was not received.

18. The decoder of claim 17 wherein the FEC-coded bytes are coded using a Reed Solomon code and the FEC decoding uses Reed Solomon decoding.

19. The decoder of claim 17 further comprising a processor, the processor:
   determining the number of packets (n) in which the at least one frame of the compression-coded video signal has been packetized and transmitted; and
   determining of the n transmitted packets, the number of packets (k) transmitted containing both high priority partition information bytes associated with the at least one frame and low priority partition information bytes.

20. The decoder of claim 19 wherein the FEC decoding uses Reed Solomon (n,k) decoding.

21. The decoder of claim 19 wherein the received packets associated with the at least one video frame of the video signal are protected against a packet loss over the packet-based network of high priority partition information bytes in up to (n-k) packets.

22. The method of claim 17 wherein the step of decompression decoding uses MPEG decoding.

23. A decoder for decoding a compression-coded video signal that has been packetized and transmitted over a packet-based network in a sequence of packets that are associated with at least one frame of the compression-coded video signal, the decoder comprising:
   means for receiving packets associated with the at least one frame of the compression-coded video signal, each of the received packets containing both low priority partition information bytes and forward error/erasure correction (FEC)-coded high priority partition data bytes associated with the at least one frame of the compression-coded video signal, the compression-coded video signal having been split into low priority and high priority partitions before being packetized and transmitted;
   means for determining which transmitted packets associated with the at least one frame of the video sequence have not been received;
   means for applying a FEC decoding to the FEC-coded high priority partition data bytes in the received packets to determine high priority partition information bytes associated with the at least one frame, the means for applying a FEC decoding reconstructing high priority partition information bytes in those packets determined not to have been received;
   means for combining the received low priority partition information bytes and the decoded and reconstructed high priority partition information bytes; and
   means for decompression-decoding the combined received low priority partition information bytes and the decoded and reconstructed high priority partition information bytes to reproduce the at least one frame of the video signal.

24. The decoder of claim 23 wherein the packet-based network is the Internet.

25. The decoder of claim 23 wherein the received FEC-coded high priority partition data bytes are coded with a systematic forward error/erasure correction code, the received FEC-coded high priority partition data bytes comprising a combination of the high priority partition information bytes associated with the at least one frame and associated parity bytes.

26. The decoder of claim 25 wherein each received packet has an equal length, the high priority partition data bytes in each received packet comprising either all high priority partition information bytes associated with the at least one frame or all parity bytes.

27. The decoder of claim 26 wherein an equal number of low priority partition information bytes are in each received packet and an equal number of high priority partition data bytes are in each received packet.

28. The decoder of claim 27 wherein for each high priority byte position associated with the received packets, high priority partition information bytes in the same high priority byte position from each received packet containing high priority partition information bytes, one byte per packet, are associated with at least one parity byte in the same byte position in one or more received packets containing parity bytes, the FEC decoding being applied to the high priority partition information bytes and associated at least one parity byte at each high priority byte position, one byte position at a time, to determine high priority partition information bytes in each high priority byte position in a packet that was not received.

29. The decoder of claim 28 wherein the FEC-coded bytes are coded with a Reed Solomon code and the FEC decoding uses Reed Solomon decoding.

30. The decoder of claim 28 further comprising processing means for:
   determining the number of packets (n) in which the at least one frame of the compression-coded video signal has been packetized and transmitted; and
   determining of the n transmitted packets, the number of packets (k) transmitted containing both high priority partition information bytes associated with the at least one frame and low priority partition information bytes.

31. The decoder of claim 30 wherein the forward error/erasure correction decoding uses Reed Solomon (n,k) decoding.

32. The decoder of claim 30 wherein the received packets associated with the at least one video frame of the video signal are protected against a packet loss over the packet-based network of high priority partition information bytes in up to (n-k) packets.

33. The decoder of claim 28 wherein the means for decompression decoding the video signal uses MPEG decoding.

34. A method of decoding a compression-coded video signal that has been packetized and transmitted over a packet-based network in a sequence of packets that are associated with at least one frame of the compression-coded video signal, the method comprising the steps of:

receiving packets associated with the at least one frame of the compression-coded video signal, each of the received packets containing both forward error/erasure correction (FEC)-coded high priority partition data bytes that have been coded with a systematic FEC code, and low priority partition information bytes associated with the at least one frame of the compression-coded video signal, the compression-coded video signal having been split into high priority and low priority partitions before having been packetized and transmitted;

determining which transmitted packets associated with the at least one frame of the video sequence have not been received;

applying a FEC decoding to the FEC-coded high priority partition data bytes in the received packets to determine high priority partition information bytes associated with the at least one frame, wherein for each high priority byte position associated with the received packets, high priority partition information bytes in the same high priority byte position from each received packet containing high priority partition information bytes, one byte per packet, are associated with at least one parity byte in the same byte position in one or more received packets containing parity bytes, the step of applying a FEC decoding further comprising applying a FEC decoding to the high priority partition information bytes and associated at least one parity byte at each high priority byte position, one byte position at a time, to reconstruct high priority partition information bytes in each high priority byte position in a packet that was determined not have been received;

combining the received low priority partition information bytes and the decoded and reconstructed high: priority partition information bytes; and decompression-decoding the combined received low priority partition information bytes and the decoded and reconstructed high priority partition information bytes to reform the at least one frame of the video signal.

35. The method of claim 34 wherein each packet has an equal length and an equal number of low priority partition information bytes are in each packet and an equal number of high priority partition information bytes or parity bytes are in each packet.

36. The method of claim 35 wherein the FEC-coded bytes are coded with a Reed Solomon code and the FEC decoder uses Reed Solomon decoding.

37. The method of claim 35 further comprising the steps of:

determining the number of packets (n) in which the at least one frame of the compression-coded video signal has been packetized and transmitted; and determining of the n transmitted packets, the number of packets (k) transmitted containing both high priority partition information bytes associated with the at least one frame and low priority partition information bytes.

38. The method of claim 37 wherein the FEC decoding uses Reed Solomon (n,k) decoding.

39. The method of claim 37 wherein the received packets associated with the at least one video frame of the video signal are protected against a packet loss over the packet-based network of high priority partition information bytes in up to (n-k) packets.

40. The method of claim 34 wherein the step of decompression coding the video signal uses MPEG decoding.

41. A decoder for decoding a video signal for transmission over a packet-based network comprising:

means for receiving packets associated with the at least one frame of the compression-coded video signal, each of the received packets containing both forward error/erasure correction (FEC)-coded high priority partition data bytes that have been coded with a systematic FEC code, and low priority partition information bytes associated with the at least one frame of the compression-coded video signal, the compression-coded video signal having been split into high priority and low priority partitions before having been packetized and transmitted;

means for determining which transmitted packets associated with the at least one frame of the video sequence have not been received;

means for applying a FEC decoding to the FEC-coded high priority partition data bytes in the received packets to determine high priority partition information bytes associated with the at least one frame, wherein for each high priority byte position associated with the received packets, high priority partition information bytes in the same high priority byte position from each received packet containing high priority partition information bytes, one byte per packet, are associated with at least one parity byte in the same byte position in one or more received packets containing parity bytes, the means for applying a FEC decoding applying a FEC decoding to the high priority partition information bytes and associated at least one parity byte at each high priority byte position, one byte position at a time, to reconstruct high priority partition information bytes in each high priority byte position in a packet that was determined not have been received;

means for combining the received low priority partition information bytes and the decoded and reconstructed high priority partition information bytes; and means for decompression-decoding the combined received low priority partition information bytes and the decoded and reconstructed high priority partition information bytes to reform the at least one frame of the video signal.

42. The decoder of claim 41 wherein each packet has an equal length and an equal number of low priority partition information bytes are in each packet and an equal number of high priority partition information bytes or parity bytes are in each packet.

43. The decoder of claim 42 wherein the FEC-coded bytes are coded with a Reed Solomon code and the FEC decoding used Reed Solomon decoding.

44. The decoder of claim 42 further comprising a processor, the processor:

determining the number of packets (n) in which the at least one frame of the compression-coded video signal has been packetized and transmitted; and determining of the n transmitted packets, the number of packets (k) transmitted containing both high priority partition information bytes associated with the at least one frame and low priority partition information bytes.

45. The decoder of claim 44 wherein the FEC decoding uses Reed Solomon (n,k) decoding.

46. The decoder of claim 44 wherein the received packets associated with the at least one video frame of the video signal are protected against a packet loss over the packet-based network of high priority partition information bytes in up to (n-k) packets.

47. The decoder of claim 41 wherein the means for decompression decoding the video signal uses MPEG decoding.

48. The method of claim 6 further comprising the step of providing to the step of decompression-decoding the low priority partition information bytes and the high priority partition information bytes, information indicating which low priority partition information bytes are missing as a result of having been transmitted in a packet determined not to have been received.

49. The decoder of claim 17 wherein the video decompression decoder is provided with information indicating which low priority partition information bytes are missing as a result of being transmitted in a packet not received.

50. The decoder of claim 28 wherein the means for decompression-decoding the low priority partition information bytes and the high priority partition information bytes is provided with information indicating which low priority information bytes are missing as a result of having been transmitted in a packet determined not to have been received.

51. The method of claim 34 further comprising the step of providing to the step of decompression-decoding the low priority partition information bytes and the high priority partition information bytes, information indicating which low priority partition information bytes are missing as a result of having been transmitted in a packet determined not to have been received.

52. The decoder of claim 41 wherein the means for decompression-decoding the low priority partition information bytes and the high priority partition information bytes is provided with information indicating which low priority information bytes are missing as a result of having been transmitted in a packet determined not to have been received.

\* \* \* \* \*